R. P. CALLARD AND C. A. RHONEMUS.
SHEET GLASS DRAWING MACHINE.
APPLICATION FILED MAY 21, 1919.
1,393,081.
Patented Oct. 11, 1921.
4 SHEETS—SHEET 3.
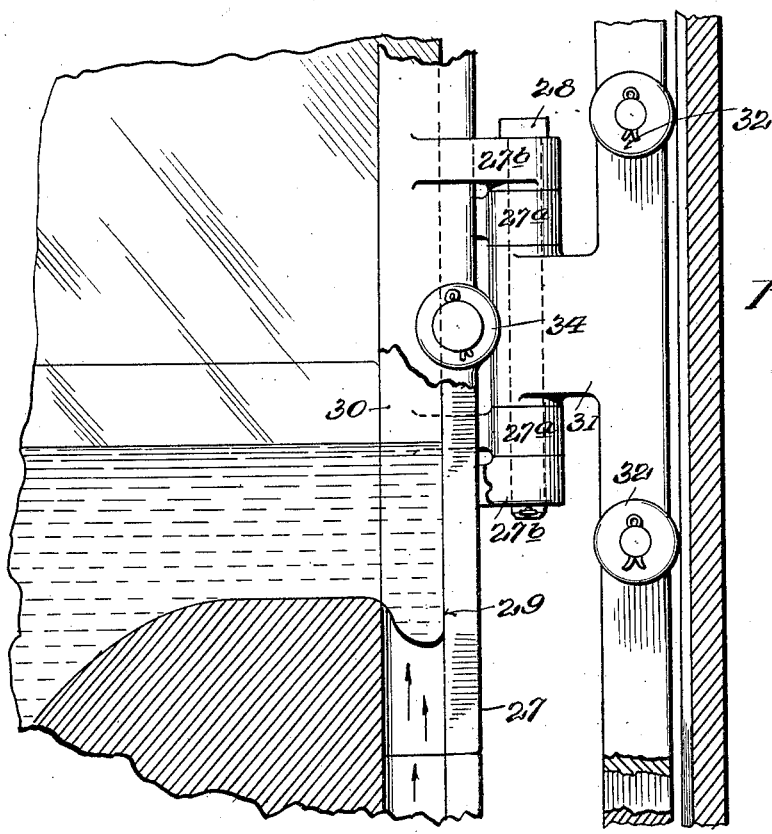
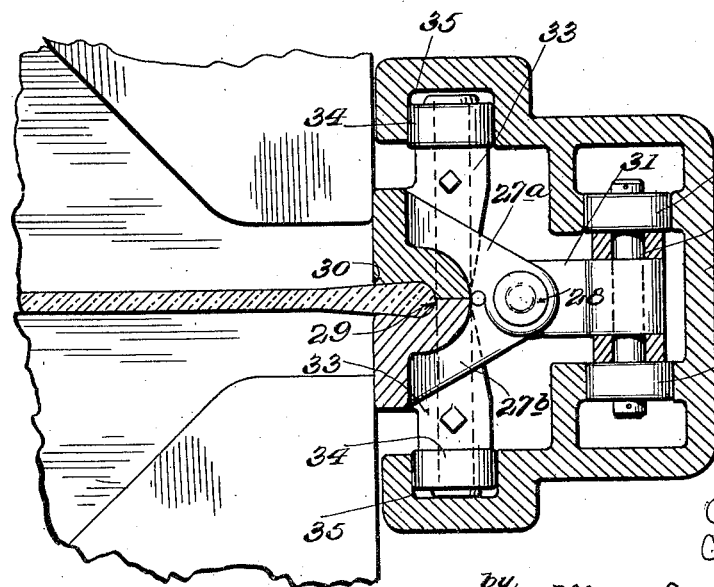

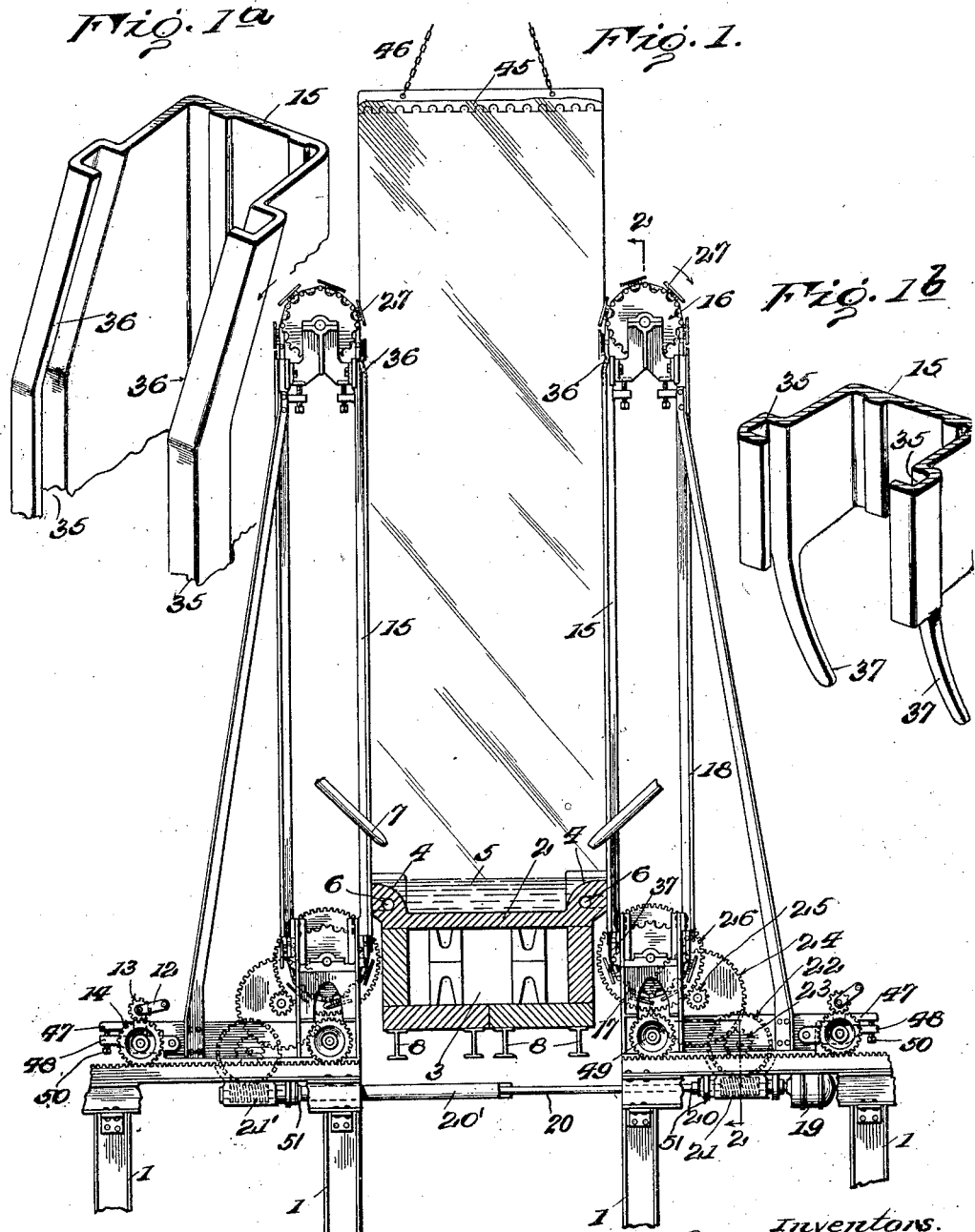

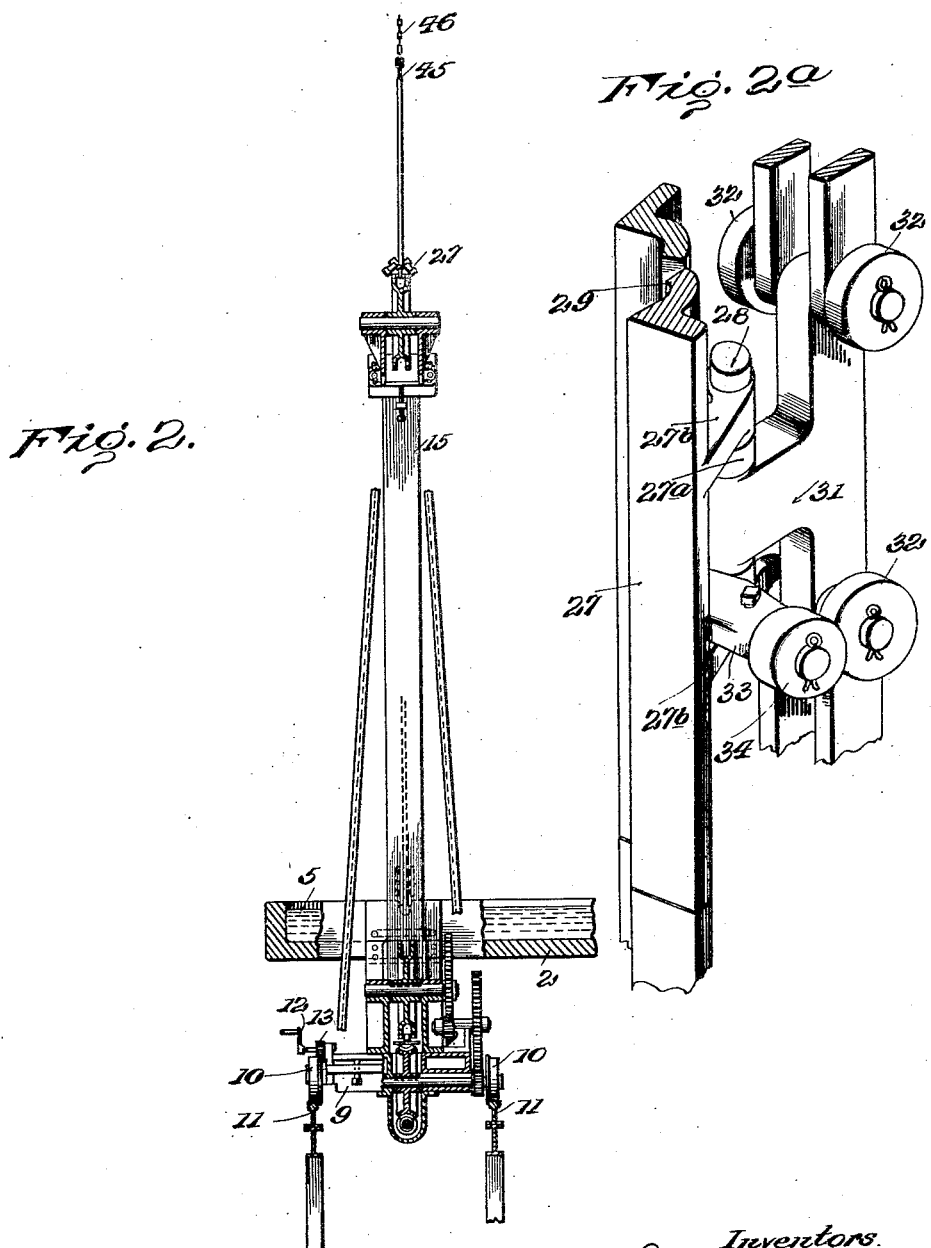

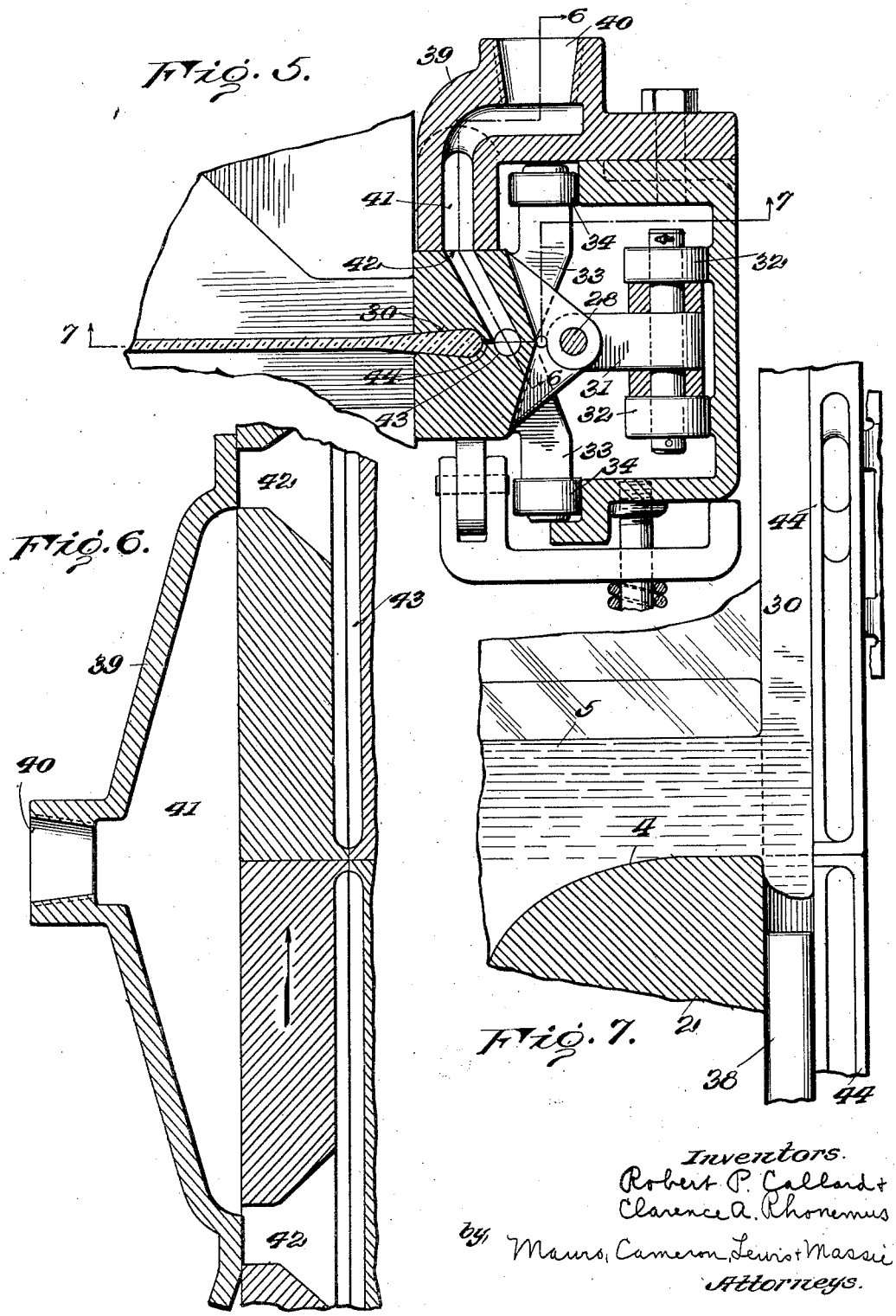

UNITED STATES PATENT OFFICE.

ROBERT P. CALLARD AND CLARENCE A. RHONEMUS, OF CHARLESTON, WEST VIRGINIA, ASSIGNORS TO THE LIBBEY-OWENS SHEET GLASS COMPANY, OF TOLEDO, OHIO, A CORPORATION OF OHIO.

SHEET-GLASS-DRAWING MACHINE.

1,393,081.  Specification of Letters Patent.  Patented Oct. 11, 1921.

Application filed May 21, 1919. Serial No. 298,666.

*To all whom it may concern:*

Be it known that we, ROBERT P. CALLARD and CLARENCE A. RHONEMUS, citizens of the United States of America, and residents of Charleston, West Virginia, have invented a new and useful Improvement in Sheet-Glass-Drawing Machines, which invention is fully set forth in the following specification.

This invention relates to the art of drawing sheet glass and is designed as an improvement on the structure shown and described in the claims of the application of Clarence A. Rhonemus, Serial No. 291,214, filed April 19, 1919, in which a suitable glass-receiving tank or pot is provided, with oppositely disposed overflow portions, the overflow from which is received by slotted, vertically moving tubular portions to overcome the narrowing tendency of the sheet and to assist in the drawing operation.

By the present invention, there is substituted for said vertical tubular members, a continuous series of tubular or cup-shaped portions, provided with means for placing the same end to end and moving them past the overflow portions of the pot, suitable slots or openings being provided for receiving said overflow. In addition to this the invention consists in a series of other improvements, the details of construction and operation of which are hereinafter more fully explained.

The inventive idea is capable of receiving a variety of mechanical expressions, one of which, for the sake of illustrating the invention, is set forth in the accompanying drawings, but said drawings are for the purpose of illustration only and not for the purpose of defining the limits of the invention, reference being had to the claims hereto appended for that purpose. In said drawings—

Figure 1 is an end elevation, with the glass-receiving pot or chamber shown in transverse section.

Fig. 1ª is a detail of the cup opening cam.

Fig. 1ᵇ is a detail of the cup closing cam.

Fig. 2 is a vertical section on the line 2—2 of Fig. 1.

Fig. 2ª is a perspective view of one of the side-holding tubular sections or cups.

Fig. 3 is a sectional detail showing the construction of the side-holding tubular sections or cups, the sprocket chain operating the same, and the overflow lip of the glass pot.

Fig. 4 is a plan view of the overflow lip and the side-retaining tubular sections or cups, the guide for the latter being shown in horizontal sections.

Fig. 5 is a horizontal sectional view through the side-retaining tubular section or cup showing the vacuum ducts therein, the overflow lip being shown in plan and the guide frame in horizontal section.

Fig. 6 is a broken sectional view on the lines 6—6 of Fig. 5.

Fig. 7 is a like view of the line 7—7 of Fig. 5, Figs. 5, 6, and 7 being more particularly designed to illustrate the means employed for producing a vacuum in the cups or tubular sections to facilitate the flow of the molten glass therein.

Referring to said drawings, in which like reference numerals refer to like parts throughout the several views, 1 represents the foundation or support for the apparatus as a whole, preferably in the form of angle iron beams, and 2 represents the usual or any suitable pot for receiving the molten glass, preferably from a continuous glass melting furnace. This pot is usually provided with a suitable heating chamber 3 thereunder, through which hot gases of combustion are conveyed for maintaining the glass at the proper temperature. Pot 2 is provided with two oppositely disposed overflow portions or channels 4—4, the bottoms of which channels are preferably in the form of overflow lips slightly below the glass level 5 in pot 2. Any suitable means may be provided for maintaining these overflow lips or portions at a proper temperature. As here shown, conduits 6—6 are formed in the body of the lips, to which hot gases of combustion are supplied from any suitable source, not shown. For the purpose of regulating and controlling the temperature of the molten glass flowing from lips 4—4, there may be and usually is provided a pair of suitable burners 7—7 for directing products of combustion onto the surface of the molten glass flowing from said lips. The tank as a whole, together with combustion chamber 3, is supported in any suitable manner, as on I-beams 8—8. The specific construction of said tank forms no part of the present invention and therefore need not be further described.

Mounted on either side of pot 2 and opposite overflow lips 4 thereof are two exactly similar frameworks, preferably carried on a suitable truck or car 9, Fig. 3, provided with wheels 10—10, traveling on rails 11—11, by which said frame-work and the mechanism connected therewith may be withdrawn from or advanced toward pot 2, as will be more fully described hereinafter.

There are two machines, one on each side of the pot, exactly similar in construction, except that one carries the motor, whereas the other does not, and a description of one will suffice for both. A crank 12 has its shaft mounted on part of the framework of car 9, and on said shaft is a gear 13 meshing with a gear 14, formed on one of wheels 10, by means of which the car may be advanced into position or withdrawn therefrom as desired.

Mounted on the car is an upright framework 15, preferably composed of angular castings. At the upper end of said framework there is supported a sprocket wheel 16 and at the lower end a corresponding sprocket wheel 17, over which sprocket wheels passes a chain 18. Supported under one of the cars is a motor 19, here shown as an electrical motor, on shaft 20 of which is formed a worm 21, gearing with a worm wheel 22 and connected by suitable gears 23, 24, 25 and 26 to the shaft of sprocket wheel 17, whereby the sprocket chain is continuously driven, the direction of movement of which is such that the inner flight of the chain is caused to move vertically upward past overflow lip 4 of pot 2. On the links of sprocket chain 18 are mounted tubular sections, molds, or cups 27, so mounted with relation to each other that in the vertical flight of the chain these tubular sections or cups are placed end to end, forming a practically continuous tubular member.

The construction of these tubular sections or cups will be best understood by reference to Figs. 2ª and 4. Each of said tubular sections or cups is composed of two longitudinal members 27ª—27ᵇ, hinged together at 28, said longitudinal sections being so formed that when in closed position they leave a longitudinal channel 29 in the section, which channel is preferably larger at its interior portion than at its marginal portion, the marginal portion being preferably reduced to a slot 30. Each of said tubular sections 27 is connected by a lug or arm 31 with a link of chain 18, which chain is provided with rollers 32—32, whereby it is guided in channels formed in framework 15. Each half 27ª, 27ᵇ of the sectional cups or channels is provided with an arm 33 bearing guide rolls 34 moving in channels 35 in the frame, whereby during the upward flight of the chain said tubular sections or cups are guided and maintained in their closed position. At the upper end of frame 15 and on the interior face thereof is arranged a pair of cam surfaces 36, which engage rollers 34 on the cup sections and act to open the cups just before they make their turn over upper sprocket wheel 16, as will be readily understood from an inspection of Fig. 1ª. The opening of the cups or tubular sections frees the same from the sheet of glass and they remain open during the downward flight of sprocket chain 18 until they reach a point where they are just in the act of starting on their upward flight, when rollers 34 engage cam surfaces 37, shown in detail in Fig. 1ᵇ, to close the cups or tubular sections. As the cups close, they embrace a plug 38, Fig. 7, whose upper end is slightly below the floor of the overflow lips, said plug being supported on the frame of the machine.

As these molds, or tubular sections, pass the overflow lips, the molten glass flows into the same through the open sides or slots therein. To facilitate this flow of the molten glass into the tubular sections or cups means are provided for maintaining a partial vacuum therein, which means are best shown in Figs. 5, 6 and 7.

Mounted on the framework of the machine is an extended cup 39, provided with a mouth 40 connected to any suitable exhaust (not shown). The face of cup 39 is closed by the sides of the cups or channels 27 passing therealong. Said cup 39 is provided with a prolonged channel or passage 41 of such length that as the cups or channels pass the same, a port 42 in one cup is closed just as a like port 42 in the next succeeding cup is opened (see Figs. 5 and 6). Said ports 42 connect in each cup with a duct 43 which, in turn, is connected by a very narrow slot 44 with tubular portions 30 of the cups 27. This slot 44 is preferably but a few thousandths of an inch in width, it being found that the molten glass will not enter so narrow a slot, while the latter will, nevertheless serve as an exhaust opening between the duct 43 and the tubular portion 30.

For the purpose of initiating the drawing operation a bait 45, of the usual or any desired construction, is employed, said bait being connected to a bridle 46, leading to any suitable source of power. The bait is lowered into the molten glass 4 in pot 2 and, after the glass has been welded thereto, the bait is slowly moved upward and the two sprocket chains 18 are simultaneously set in operation moving at the same speed as the bait. The tubular sections, with a bead of glass engaged therein on either edge of the sheet, prevent the narrowing of the latter and also assist in the drawing operation. As the sheet is elevated and begins to cool, it contracts in width, and it is therefore necessary to provide means whereby the upper portions of the sprocket chains shall be slightly nearer to each other than the bottom portions. With this object in view, the frames 15 are mounted on tiltable supports on their respective carriages. Referring to Fig. 1, 47 is the tiltable portion of the carriage and 48 is a fixed portion thereof, the tiltable portion 47 turning around shaft 49, constituting the axles of the front wheels of the carriage. An adjusting nut 50 passes through portion 48 as a nut and bears on the under side of tiltable portion 47. By operating said nut, the outer end of the tiltable support 47 is slightly raised, thereby inclining the upper ends of the frames 15 inward and thus compensating for the narrowing tendency of the sheet.

The shaft 20 is made in two slidably connected sections, 20 and 20', the portion 20' having a worm 21' coöperating with the left-hand machine, Fig. 1, precisely as worm 21 coöperates with the right-hand machine in said figure. When supports 47 are tilted, universal joints 51 permit such tilting action without interrupting the operation of the drive shaft.

When the sheet of glass is drawn upward past sprocket wheels 16 on frames 15, the upper portion of the sheet, together with the bait attached thereto, is severed from the drawing sheet and removed to a suitable leer for annealing, the bait having been previously detached from said severed section. Thereafter, the drawing of the sheet is accomplished entirely by the action of the tubular sections attached to the sprocket chains, which tubular sections not only serve to draw the sheet, but serve to prevent the narrowing thereof.

By the means thus described a sheet of glass is continuously drawn from the mass of molten glass in the pot, of uniform width, the speed of drawing being determined by the speed imparted to sprocket chains 18.

Having thus described our invention, what is claimed is:

1. In a sheet glass drawing machine, the combination of a pot for molten glass having oppositely-disposed overflow portions, an endless series of slotted tubular sections, and means moving said series of tubular sections vertically past one of said overflow portions.

2. In a sheet glass drawing machine, the combination of a pot for molten glass having oppositely-disposed overflow lips, an endless series of slotted tubular sections adjacent each overflow lip, and means moving each series vertically past one of said overflow lips.

3. In a sheet glass drawing machine, the combination of a pot for molten glass having oppositely-disposed overflow lips, an endless series of slotted tubular sections adjacent each overflow lip, said tubular sections being composed of two portions hinged together, means moving each series vertically past one of said overflow lips, and automatic mechanism closing and opening said tubular sections.

4. In a sheet glass drawing machine, the combination of a pot for molten glass having oppositely-disposed overflow lips, a continuous series of slotted tubular sections mounted on sprocket chains adjacent each overflow lip and means for simultaneously driving said sprocket chains so as to move said series of tubular sections past said overflow lips.

5. In a sheet glass drawing machine, the combination of a pot for molten glass having oppositely-disposed overflow lips, a movable carriage opposite each overflow lip, and a continuous connected series of slotted tubular sections mounted on each of said carriages, and means for moving said series of tubular sections vertically past said overflow lips.

6. In a sheet glass drawing machine, the combination of a pot for molten glass having oppositely-disposed overflow-portions, a carriage mounted to move toward and from each overflow-portion, a vertical sprocket chain mounted on each of said carriages, and a continuous series of slotted tubular sections mounted on each of said sprocket chains, and means for simultaneously driving said sprocket chains.

7. In a sheet glass drawing machine, the combination of a pot for molten glass having oppositely-disposed overflow-portions, a carriage mounted opposite each of said portions, said carriage being provided with a vertically tiltable support, an upright frame mounted on said tiltable support, a vertically movable sprocket chain on each of said frames, means for simultaneously driving said sprocket chains, and a continuous series of slotted tubular sections mounted on said sprocket chains to be moved past said overflow-portions.

8. In a sheet glass drawing machine, the combination of a pot for molten glass having oppositely-disposed overflow portions, a continuous connected series of slotted tubular sections adjacent each overflow portion, means for moving each of said series vertically past one of said overflow-portions, and means for exhausting air from said tubular sections as the same pass said overflow-portions.

9. In a sheet glass drawing machine, the combination of a pot for molten glass having oppositely-disposed overflow portions, an endless series of sheet glass drawing devices movable vertically past said overflow portions on each side of the machine, a common drive shaft actuating each of said series of drawing devices, and a motor for driving said shaft.

10. In a sheet glass drawing machine the combination of a pot for molten glass having oppositely disposed overflow-portions, a continuously connected series of slotted tubular sections, means moving each of said series vertically past one of said overflow lips, said moving means being mounted on two tiltable supports on opposite sides of the machine, a universally jointed driving shaft simultaneously actuating said moving means, and a motor connected to said shaft and carried by one of said tiltable supports.

11. In a sheet glass drawing machine, the combination of a pot for molten glass having oppositely-disposed overflow portions, two movable tiltable supports one opposite each overflow portion, a continuous connected series of slotted tubular sections on each of said tiltable supports, means for exhausting air from each of said tubular sections as it passes said overflow portion, and means moving each of said series of slotted tubular sections vertically past its adjacent overflow lip.

12. In a sheet glass drawing machine, the combination of a pot for molten glass having oppositely-disposed overflow portions, a continuous connected series of slotted tubular sections adjacent each overflow portion, means moving each of said series of tubular sections vertically past one of said overflow portions, means for exhausting air from each of said tubular sections as it passes the overflow portion, and means closing each of said tubular sections against the inflow of air as it passes said overflow portion.

13. In a continuous sheet glass drawing machine, the combination of a receptacle for molten glass having oppositely disposed overflow portions, and sheet drawing and width maintaining means, comprising an endless series of edge molding devices movable vertically past each of the overflow portions, for forming the sheet edges and holding them out laterally while simultaneously drawing the sheet upward.

14. In a continuous sheet glass drawing machine, the combination of a receptacle for molten glass, and sheet drawing and width maintaining means, comprising two series of edge molding devices movable vertically, one at each side of the receptacle, for forming the sheet edges and holding them out laterally while simultaneously drawing the sheet upward, and means for causing the molten glass to flow into the edge molds.

15. In a continuous sheet glass drawing machine, the combination of a receptacle for molten glass, and sheet drawing and width maintaining means, comprising two series of edge molding devices movable vertically, one series at each side of the receptacle, for forming the sheet edges and holding them out laterally while simultaneously drawing the sheet upward, and suction means for causing the molten glass to flow into the edge molds.

In testimony whereof we have signed this specification.

ROBERT P. CALLARD.
CLARENCE A. RHONEMUS.